United States Patent
Boudouris et al.

(10) Patent No.: US 9,028,951 B2
(45) Date of Patent: May 12, 2015

(54) MAGNETIC RECEPTIVE PRINTABLE MEDIA

(71) Applicant: MagnetNotes, Ltd., Toledo, OH (US)

(72) Inventors: Randall Boudouris, Sylvania, OH (US); Luke Rundquist, Sylvania, OH (US)

(73) Assignee: Magnetnotes, Ltd., Toledo, OH (US)

( * ) Notice: Subject to any disclaimer, the term of this patent is extended or adjusted under 35 U.S.C. 154(b) by 0 days.

(21) Appl. No.: 14/022,923

(22) Filed: Sep. 10, 2013

(65) Prior Publication Data

US 2015/0069650 A1    Mar. 12, 2015

(51) Int. Cl.
| | |
|---|---|
| *B32B 3/00* | (2006.01) |
| *B32B 27/30* | (2006.01) |
| *B29C 47/02* | (2006.01) |
| *B41M 3/18* | (2006.01) |
| *D21H 27/20* | (2006.01) |
| *E04F 13/00* | (2006.01) |
| *G09F 3/04* | (2006.01) |
| *C09D 5/23* | (2006.01) |

(52) U.S. Cl.
CPC .............. *B32B 27/308* (2013.01); *B29C 47/02* (2013.01); *B41M 3/18* (2013.01); *D21H 27/20* (2013.01); *E04F 13/002* (2013.01); *G09F 3/04* (2013.01); *C09D 5/23* (2013.01)

(58) Field of Classification Search
CPC .................................... C09D 5/06; C09D 5/23
USPC ........................................................ 428/195.1
See application file for complete search history.

(56) References Cited

U.S. PATENT DOCUMENTS

| | | |
|---|---|---|
| 2,690,206 A | 9/1954 | Mueller |
| 2,944,586 A | 7/1960 | Yanulis |
| 3,033,707 A | 5/1962 | Chervenak et al. |
| 3,117,092 A | 1/1964 | Parker |
| 3,221,315 A | 11/1965 | Brown, Jr. et. al. |
| 3,470,055 A | 9/1969 | Wade |
| 3,496,603 A | 2/1970 | Listner et al. |
| 3,616,191 A | 10/1971 | Fuerholzer et al. |
| 3,867,299 A | 2/1975 | Rohatgi |
| 4,022,701 A | 5/1977 | Sawa et al. |
| 4,128,386 A | 12/1978 | Wissinger et al. |
| 4,140,463 A | 2/1979 | Brinkmann et al. |
| 4,234,378 A | 11/1980 | Iwasaki et al. |
| 4,310,978 A | 1/1982 | Stern |

(Continued)

FOREIGN PATENT DOCUMENTS

| | | |
|---|---|---|
| BE | 1005966 | 4/1994 |
| CA | 2210174 | 1/1998 |

(Continued)

OTHER PUBLICATIONS

R.T. Schorenberg, "Roll Coating", Modern Plastic Encyclopedia, 1984-1985, pp. 202-203.
Coatings Technology Handbook, 2nd Edition, Satas and Tracton, Marcel Dekker, Inc., 2001, pp. 1-9.
Bostik, Products, http://www.bostik-us.com/products/index. asp?fa=categoreis&divisionId=9&categoryId=35; pp. 1-2, no date available, accessed Apr. 1, 2005.

(Continued)

*Primary Examiner* — Elizabeth Mulvaney
(74) *Attorney, Agent, or Firm* — Vidas, Arrett & Steinkraus

(57) ABSTRACT

Magnetic receptive media, the magnetic receptive media comprises at least one printable substrate layer and at least one layer formed from a hot melt polymer composition, the hot melt polymer composition comprising Greater than about 70% to about 95% magnetite and about 5% to less than about 30% thermoplastic polymer and methods of making and using the same.

18 Claims, 1 Drawing Sheet

(56) References Cited

U.S. PATENT DOCUMENTS

| | | | |
|---|---|---|---|
| 4,388,349 A | 6/1983 | Korpman et al. |
| 4,427,481 A | 1/1984 | Smith et al. |
| 4,455,184 A | 6/1984 | Thompson |
| 4,479,838 A | 10/1984 | Dunsirn et al. |
| 4,588,209 A | 5/1986 | Zebrowski et al. |
| 4,621,837 A | 11/1986 | Mack |
| 4,857,594 A | 8/1989 | Lakshmanan et al. |
| 4,941,935 A | 7/1990 | Gregory |
| 4,944,802 A | 7/1990 | Chagnon et al. |
| 4,996,110 A | 2/1991 | Tanuma et al. |
| 5,002,677 A | 3/1991 | Srail et al. |
| 5,019,436 A | 5/1991 | Schramer et al. |
| 5,114,517 A | 5/1992 | Rippingale et al. |
| 5,194,299 A | 3/1993 | Fry |
| 5,397,843 A | 3/1995 | Lakshmanan et al. |
| 5,458,282 A | 10/1995 | Martin |
| 5,478,891 A | 12/1995 | Lakshmanan et al. |
| 5,482,982 A | 1/1996 | Lakshmanan et al. |
| 5,503,891 A | 4/1996 | Marshall et al. |
| 5,505,620 A | 4/1996 | Barlett |
| 5,609,788 A | 3/1997 | Deetz |
| 5,641,116 A | 6/1997 | Martin |
| 5,665,429 A | 9/1997 | Elwakil |
| 5,676,307 A | 10/1997 | Martin |
| 5,676,791 A | 10/1997 | Christel |
| 5,699,956 A | 12/1997 | Brennan |
| 5,736,237 A | 4/1998 | Rhee et al. |
| 5,788,073 A | 8/1998 | Suryk |
| 5,843,329 A | 12/1998 | Deetz |
| 5,844,458 A | 12/1998 | Bartholomew et al. |
| 5,868,498 A | 2/1999 | Martin |
| 5,869,148 A | 2/1999 | Silverschotz et al. |
| 5,879,784 A | 3/1999 | Breen et al. |
| 5,891,204 A | 4/1999 | Neff |
| 5,924,624 A | 7/1999 | Martin |
| 5,949,050 A | 9/1999 | Fosbenner et al. |
| 5,983,537 A | 11/1999 | Johnson |
| 5,985,435 A | 11/1999 | Czaplicki et al. |
| 5,990,218 A | 11/1999 | Hill et al. |
| 5,994,990 A | 11/1999 | Ogikubo |
| 6,024,277 A | 2/2000 | Martin |
| 6,134,821 A | 10/2000 | Love |
| 6,153,279 A | 11/2000 | Charley |
| 6,190,573 B1 | 2/2001 | Ito |
| 6,228,933 B1 | 5/2001 | Hiles |
| 6,262,174 B1 | 7/2001 | Cooper et al. |
| 6,304,162 B1 | 10/2001 | Nakatsuka et al. |
| 6,312,795 B1 | 11/2001 | Yamamoto |
| 6,387,485 B1 | 5/2002 | Bielek et al. |
| 6,436,520 B1 | 8/2002 | Yamamoto |
| 6,451,221 B1 | 9/2002 | Hart et al. |
| 6,464,894 B1 | 10/2002 | Antochin et al. |
| 6,468,678 B1 | 10/2002 | Dahlin et al. |
| 6,476,113 B1 | 11/2002 | Hiles |
| 6,494,968 B1 | 12/2002 | Hamano et al. |
| 6,596,096 B2 | 7/2003 | Carl et al. |
| 6,693,506 B2 | 2/2004 | Matsumura et al. |
| 6,707,361 B2 | 3/2004 | Blume |
| 6,714,114 B2 | 3/2004 | Matsumura et al. |
| 6,726,781 B2 | 4/2004 | Walmer et al. |
| 6,749,750 B2 | 6/2004 | Barbera-Guillem et al. |
| 6,764,732 B2 | 7/2004 | Stefanutti et al. |
| 6,881,450 B1 | 4/2005 | Texier |
| 7,128,798 B2 | 10/2006 | Boudouris et al. |
| 7,225,568 B1 | 6/2007 | Rizzo et al. |
| 7,373,747 B1 | 5/2008 | Wiemer et al. |
| 2002/0081446 A1 | 6/2002 | Boudouris et al. |
| 2003/0152731 A1 | 8/2003 | Deetz et al. |
| 2004/0009370 A1 | 1/2004 | Abe |
| 2004/0191572 A1 | 9/2004 | Gao et al. |
| 2005/0262787 A1 | 12/2005 | Goss |
| 2008/0152902 A1 | 6/2008 | Adler |
| 2009/0020727 A1 | 1/2009 | Deetz |
| 2009/0191401 A1 | 7/2009 | Deetz |
| 2010/0127207 A1 | 5/2010 | Deetz |
| 2011/0165386 A1 | 7/2011 | Deetz |
| 2013/0130000 A1 | 5/2013 | Deetz |
| 2013/0183500 A1 | 7/2013 | Kasperchik et al. |
| 2013/0183501 A1 | 7/2013 | Kasperchik et al. |

FOREIGN PATENT DOCUMENTS

| | | |
|---|---|---|
| CN | 1032641 | 5/1989 |
| DE | 19739174 | 3/1993 |
| DE | 4441545 | 5/1995 |
| EP | 0315063 | 5/1989 |
| EP | 0372758 | 6/1990 |
| EP | 1063659 | 12/2000 |
| GB | 1116861 | 11/1964 |
| GB | 2315367 | 1/1998 |
| JP | 59170130 | 9/1984 |
| JP | 63069204 | 3/1988 |
| JP | 01014901 | 1/1989 |
| JP | 01131259 | 5/1989 |
| JP | 01131260 | 5/1989 |
| JP | 01131261 | 5/1989 |
| JP | 01131262 | 5/1989 |
| JP | 02155738 | 6/1990 |
| JP | 07-104670 | 4/1995 |
| JP | 07-226318 | 8/1995 |
| JP | 07-250460 | 9/1995 |
| JP | 09-232133 | 9/1997 |
| JP | 09-270318 | 10/1997 |
| JP | 09-315090 | 12/1997 |
| JP | 10-024534 | 1/1998 |
| JP | 10-219003 | 8/1998 |
| JP | 11-121219 | 4/1999 |
| JP | 2000-047343 | 2/2000 |
| JP | 2000-348958 | 12/2000 |
| JP | 2001-006924 | 1/2001 |
| JP | 2001-068337 | 3/2001 |
| JP | 2001-076920 | 3/2001 |
| JP | 2001-115044 | 4/2001 |
| JP | 2001-139704 | 5/2001 |
| JP | 2001-230118 | 8/2001 |
| JP | 2001-250733 | 9/2001 |
| JP | 2001-257111 | 9/2001 |
| JP | 2001-297910 | 10/2001 |
| JP | 2002-099216 | 4/2002 |
| JP | 2002-172737 | 6/2002 |
| JP | 2002-244562 | 8/2002 |
| JP | 2002-329608 | 11/2002 |
| JP | 2002-353025 | 12/2002 |
| JP | 2003-011278 | 1/2003 |
| JP | 2003-045713 | 2/2003 |
| JP | 2003-045714 | 2/2003 |
| JP | 2003-059714 | 2/2003 |
| JP | 2003-068527 | 3/2003 |
| JP | 2003-071978 | 3/2003 |
| JP | 2003-097536 | 4/2003 |
| JP | 2004-029095 | 1/2004 |
| JP | 2004-055992 | 2/2004 |
| SU | 981325 | 12/1982 |
| SU | 1030386 | 7/1983 |
| SU | 1219611 | 3/1986 |
| WO | 00/01776 | 1/2000 |
| WO | 01/69612 | 9/2001 |
| WO | 02/42074 | 5/2002 |

OTHER PUBLICATIONS

Bostik, Hot melt Adhesives, http://www.bostik-us.com/products/index.asp?fa=subCategories&divisionId=4&categoryId=11&subCategoryId=19; pp. 1-2, no date available, accessed Apr. 1, 2005.

Bostik, Vitel Co-Polyester Resins, http://www.bostik-us.com/products/index.asp?fa=subCategories&divisionId=4&categoryId=11&subCategoryId=24; p. 1, no date available, accessed Apr. 1, 2005.

Bostik, High Performance Polymers, http://www.industrypackaging.com/packaging/us/Bostic/High_Performance_Polymers_Adhesives/199_0/g_supplier_5. thml; pp. 4-6, no date available, accessed Apr. 1, 2005.

MAGNETIC RECEPTIVE PRINTABLE MEDIA

CROSS-REFERENCE TO RELATED APPLICATIONS

None.

BACKGROUND OF THE INVENTION

The present invention relates to magnetic receptive media and to methods of making the same.

Magnetic receptive systems have become a popular method by which retailers as well as other businesses industries can display large in-store displays including advertising or other graphic media that is readily interchangeable and easily updated. This is a versatile, cost-effective method for meeting changeable graphic needs.

These systems involve a magnetic backing or sheeting on which magnetic receptive media can be displayed. Many retailers are now employing sections of walls having magnetic backing or sheeting in order to display their readily interchangeable graphic media. This is typically applied to the wall with an adhesive composition.

Conventional processes for forming magnetic receptive printable media is to apply a magnetic receptive coating to an extruded film after extruding after the extrusion process.

US Patent Pub. Nos. 20130130000 and 20100127207 disclose magnetic receptive particles embodied in the formulation of an extruded film with properties that will adhere to magnets.

However, these formulations include at most, about 70% of the magnetic receptive particles by weight of the core layer which is polyolefin, polypropylene or blends thereof.

It has been found to be, however, beneficial to employ higher concentrations of magnetic receptive particles for both improved magnetic strength between the magnetic backing and the magnetic receptive media, as well as be able to employ a thinner layer of the magnetic receptive coating.

There remains a need in the art for a simplified method of making an extruded magnetic receptive printable media wherein the magnetic receptive coating employs high loadings of magnetic receptive particles in a unitary extrusion process.

SUMMARY OF THE INVENTION

In one aspect, the present invention relates to magnetic receptive media formed from a hot melt polymer composition, the hot melt polymer composition comprising greater than about 70% to about 95% magnetite and about 5% to less than about 30% thermoplastic polymer.

In another aspect, the present invention relates to an in-line method of manufacturing magnetic receptive media, the magnetic receptive media having dimensions of thickness, width and length, the method comprising providing a hot melt composition comprising about 60% to about 95% magnetite and about 5% to about 40% thermoplastic polymer and extruding said hot melt composition at an elevated temperature directly onto a printable substrate layer using a slot die head to form a roll or a sheet comprising the printable substrate layer and a layer of the hot melt composition at a speed of about 60 feet/minute to about 1000 feet/minute.

In another aspect, the present invention relates to a continuous system for preparing a magnetic receptive media, the magnetic assembly comprising at least one printed substrate layer and at least one magnetic layer, the system comprising an extruder for applying the magnetic layer, at least one slot die head in communication with the extruder, a moving substrate, the extruder supplies the slot die head with a thermoplastic magnetic receptive composition comprising at least one polymer and magnetic receptive particles, the slot die head applies the thermoplastic magnetic receptive composition onto said substrate to form the magnetic receptive layer on the substrate, a printing press, the substrate is advanced through the printing press and a controller, wherein the extruder and the printing press are in operative communication with the controller, so that the thickness of the magnetic layer and the speed of the moving substrate can be controlled by the controller.

These and other aspects, embodiments and advantages of the present disclosure will become immediately apparent to those of ordinary skill in the art upon review of the Detailed Description and Claims to follow.

DETAILED DESCRIPTION OF THE INVENTION

Figure 1:
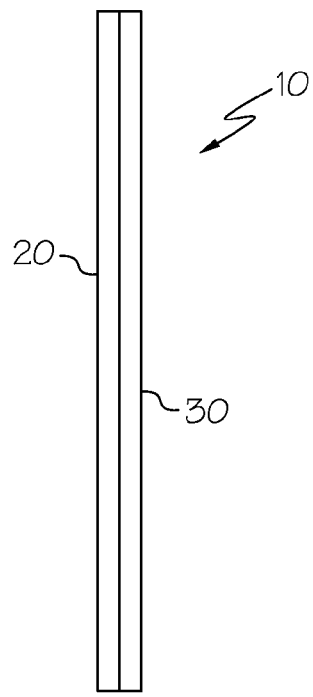
FIG. 1 is a side view of a magnetic receptive media according to the invention.

While embodiments of the present disclosure may take many forms, there are described in detail herein specific embodiments of the present disclosure. This description is an exemplification of the principles of the present disclosure and is not intended to limit the disclosure to the particular embodiments illustrated.

The present invention relates to improved magnetic receptive printable media which can be employed in combination with a magnetic backing to form magnetic, graphic wall systems.

The magnetic receptive printable media includes at least two layers, one layer of which comprises at least one thermoplastic polymer and magnetic receptive particles and one layer of which comprises a printable substrate material.

The magnetic substrate layer includes greater than about 70% to about 95% by weight of the magnetic receptive particles and about 5% to less than about 30% of at least one thermoplastic polymer, suitably about 75% to about 95% by weight of the magnetic receptive particles, more suitably about 80% to about 90% by weight of the magnetic receptive particles, and most suitably about 85% to about 90% by weight of the magnetic receptive particles, suitably about 5% to about 25% by weight of at least one thermoplastic polymer, more suitably about 10% to about 20% by weight of at least one thermoplastic polymer, and most suitably about 10% to about 15% by weight of the at least one thermoplastic polymeric. The magnetic material is uniformly dispersed in the polymeric binder.

In some embodiments, the magnetic receptive particles are ferrimagnetic.

In some embodiments, the magnetic receptive particles are magnetite. Magnetite is an iron oxide having the chemical formula $Fe_3O_4$.

Other ferrimagnetic materials include, for example, YIG (yttrium iron garnet) and ferrites composed of iron oxides of other metals such as aluminum, cobalt, manganese and zinc.

The thermoplastic material, often referred to in the industry as a thermoplastic binder, suitable for use in the process of the present invention may include any polymeric material that is readily processable with the magnetic material on, for instance, the thermoplastic or hot melt processing equipment as described in detail below. Such thermoplastic materials include both thermoplastic elastomers and non-elastomers or any mixture thereof.

It is desirable that the magnetic receptive layer readily adhere to the printable substrate layer. The choice of thermoplastic polymer may therefore be influenced by the printable substrate material being employed, and the adhesion obtained between the magnetic receptive layer and the printable substrate material.

Suitable polymer materials are disclosed in commonly assigned U.S. Pat. Nos. 7,128,798 and 7,338,798, each of which is incorporated by reference herein in its entirety.

Examples of suitable polymer materials include hompolymers, copolymers and terpolymers of olefins including ethylene, propylene and butylene.

In some embodiments, the thermoplastic polymer is copolymer of ethylene or a blend thereof.

Suitable monomers include, but are not limited to, vinyl acetate, n-butyl (meth)acrylate, ethylene methyl (meth)acrylate, ethylene ethyl (meth)acrylate, and (meth)acrylic acid.

Interpolymers of ethylene with at least one $C_3$ to $C_{20}$ alpha-olefin are also useful herein.

Specific examples of suitable copolymers of ethylene include, but are not limited to, ethylene vinyl acetate (EVA), ethylene n-butyl acrylate (EnBA), ethylene (meth)acrylate (EMA), and so forth.

In some embodiments, the thermoplastic material includes at least one EVA copolymer or a blend thereof.

Thermosetting polymers may also be employed herein.

These lists are intended for illustrative purposes only. There are many other suitable polymer materials including thermoplastic elastomers of styrene, styrenic block copolymers which include butylene, isopropylene, ethylene butylene, ethylene propylene, and so forth, and polyurethane elastomers, polyesters elastomers, elastomers of ethylene propylene, and so froth.

Other polymer materials include polyesters, polyamides, polyethers, as well as copolymers and terpolymers formed with esters, amides and ethers.

Other optional ingredients include, but are not limited to, tackifying resins, plasticizers antioxidants, dyes or pigments, UV agents, and so forth. Such optional ingredients are known to those of skill in the art and are typically added in low concentrations which do not adversely affect the physical characteristics of the composition.

These lists of materials described above are intended for illustrative purposes only, and are by no means exclusive of the materials which may be employed in the magnetic composition herein, and as such is not intended as a limit on the scope of the invention herein.

The magnetic receptive particles and the thermoplastic polymer and/or other ingredients are blended at elevated temperatures using standard thermoplastic mixing equipment such as extruders, Baker Perkins, Banbury mixers, single or twin screw extruders, Farrell Continuous mixers, and high shear mixing equipment.

The mixture may be compounded and made into a form, such as slats, pellets or any form known in the art suitable for feedstock for extrusion or other melt processing equipment, which is then delivered to the coating company. The coating company may then use a high pressure single screw extruder, or other processing equipment to melt and pressurize the mixture, to force it through an application head such as a slot die, rotary screen head, or other such application head, at the coating station. Thus, the extruder or other hot melt equipment supplies the resultant magnetic receptive composition directly to the application head. During extrusion or other melt processing of the magnetic receptive composition, the temperature may be high enough that the composition is considered to be molten, i.e. in melted or liquid form.

In an alternative embodiment of the present invention, various ingredients may be supplied to the extruder in individual pellets, slats, and so forth. For instance, if more than one thermoplastic polymer is employed, they do not have to be supplied as a mixture already in pellet or slat form. They may each be supplied in pellet or slat form individually, for example.

In one embodiment, pellets are employed.

Coating companies can use a variety of application processes known in the art. Examples of application processes useful in applying the magnetic receptive composition to the printable substrate include, but are not limited to, slot die coating, roll coating or reverse roll coating, knife-over-roll gravure and reverse direct gravure, wire rod coating, air-knife coating, slot-orifice coating, screen printing with a hot screen, and so forth.

In one embodiment of the present invention, slot die coating is used in combination with a single screw extruder.

Due to the high amount of magnetic receptive particles in the magnetic receptive compositions, slot dies can wear out extremely fast. It has been found that by using tungsten carbide or zirconium oxide on the coating edge of the slot dies, the useful lifetime of the slot die can be greatly increased by up to several months.

In some embodiments, a plurality of mini slot die heads are employed to apply a series of equally spaced stripes of magnetic receptive material to the substrate. These slot die heads may vary in length from as little as 0.25 inches.

In one embodiment, four slot die heads apply magnetic receptive stripes 1 inch wide.

In one embodiment, four slot die heads apply magnetic receptive stripes 1 inch and 8 mils (about 203 microns) thick across a 32" paper web.

A coating method referred to in the art as flex-o-press may also be employed. The term "flex-o-press" as used herein, generally refers to a four roll coating method by which a first roll which is heated, and typically turns at a speed which is half of the second roll. The second roll carries the thermoplastic/magnetic receptive mixture. A third roll is a roll-plate roll which is a silicone rubberized roll and may have a patterned surface with raised areas for application of the magnetic receptive composition of the present invention to the printable substrate in a predetermined pattern. This roll comes into light contact with the second roll and then transfers the thermoplastic/magnetic receptive mixture to a fourth roll. See Roll Coating by R. T. Schorenberg, Modern Plastic Encyclopedia, 1984-1985, pp. 202-203, which is incorporated herein by reference in its entirety. Another useful reference is Coatings Technology Handbook, 2nd Edition, Satas and Tracton, Marcel Dekker, Inc., 2001 also which is incorporated by reference herein in its entirety. Desirably, the processing equipment includes a chill roll for increasing the speed with which the resultant magnetic receptive composition, including at least the magnetic receptive material and a thermoplastic polymer, cools and sets. This is advantageous for more rapidly processing the resultant composition into rolls or sheets, for instance.

The process according to the invention can be employed to make any printed substrate and finds particular utility for those substrates formed from paper, paper products or pasteboard. However, other materials can be employed as well including, but not limited to, plastic or polymeric materials, metal, release liners such as silicone release liner, textiles or fabrics, and so forth. Combinations of any of the substrates may also be employed.

In particular embodiments, the substrate is a layered or laminated substrate and includes paper, paper products or pasteboard and a foil wrap.

The application temperature required may depend on numerous factors including the melting temperature of the thermoplastic polymer, the viscosity of the resultant magnetic receptive composition, and so forth. The melting temperature and viscosity may vary depending not only on the type of polymer used, but on the various other ingredients which may be employed in the magnetic receptive composition as described above. The higher the viscosity or melting temperature, the higher the temperature that may be required to successfully apply the magnetic receptive composition. This of course also depends on the application equipment being employed. In general, thermoplastic materials are applied at temperatures of about 275° F. to about 375° F. (about 135° C. to about 190° C.), although some may be applied at higher or lower temperatures. For instance, very low viscosity thermoplastics may be applied at temperatures of as low as about 190° F. (about 90° C.). Some may be applied at temperatures as high as about 400° F. (about 205° C.), or higher, for instance polyamide materials are often applied at temperatures of about 400° F. Temperatures used, can even exceed 650° F., however. However, for most thermoplastic materials higher temperatures lead to more rapid degradation of the material. An often used application temperature range is about 325° F. to about 375° F. (about 160° C. to about 190° C.), with 350° F. (about 175° C.) being very common.

The temperature should be sufficient to lower the viscosity of the thermoplastic material to allow the thermoplastic material to sufficiently adhere to the printable substrate. This may involve penetration into, or "wet out" of the substrate surface to which it is being applied. The thermoplastic material must be sufficiently adhered to the substrate so that delamination from the substrates does not occur.

Using the method of the present invention, the resultant magnetic receptive composition may be advantageously applied in a thin layer of about 0.002 inches to about 0.030 inches (about 50μ to about 765μ; about 2 mils to about 30 mils), suitably about 0.002 inches to about 0.020 inches (about 50μ to about 510μ; about 2 mils to about 20 mils) and most suitably about 0.003 inches to about 0.012 inches (about 75μ to about 305μ; about 3 mils to about 12 mils thick. The present invention allows for application of a thinner layer of the polymer/magnetic receptive mixture. In one embodiment, the magnetic receptive layer is 8 mils (about 203 microns) thick.

The thickness of the magnetic receptive layer can be accurately and precisely controlled in real time using the present invention. A nuclear backscatter device or a laser measuring device can be employed in-line. A nuclear backscatter device measures the density of the polymeric magnetic receptive composition. This allows for accurate real time measurements as to the thickness of the magnetic receptive layer.

Once the entire magnetic receptive media has been produced in roll or sheet form, the desired shapes may be cut, punched, stamped, or so forth from the assembly, either at the point of manufacture of the magnetic receptive material, or by those to which the magnetic receptive media is supplied as desired. Laser cutting is one example of a method by which various articles may be formed from the sheet or web.

The sheets or rolls are then fed through a printing press such as flexo, gravure, rotary offset, digital or screen printing presses.

To form the magnetic receptive media, a substrate is fed to the extruder via a roll coater or in sheet form wherein the magnetic receptive composition is applied using a slot die head or multiple slot die heads such as mini slot die heads as disclosed. Alignment of the magnetic receptive particles is accomplished almost simultaneously with extrusion. The substrate is then fed through the printing press. The substrate can then optionally be fed through another printing press, or fed back through the same printing press.

Using magnetic receptive printable media of this type does not require running a magnet through a printer.

The rolls or sheets may be as wide as 60 inches. If in roll form, once the magnetic receptive material has been applied, the roll may be die cut into sheets of any desired size. Printing can be done either before or after die cutting of the roll.

FIG. 1 is a side view illustrating a magnetic receptive media 10 having a magnetic receptive layer 20 and a printable/printed substrate layer 30.

The magnetic receptive media formed herein may be useful for any signage or graphic display such as full size wall advertisements or banners for retail stores, bill boards, and so forth.

A rubber magnet can be built into a wall or a billboard formed therefrom or a magnetic composition may be otherwise coated thereon.

The rubber magnet may be about 20 mils (508 microns) to about 40 mils (1016 microns), or about 500 to about 510 microns to about 1000 to about 1020 microns thick.

The magnetic receptive media can then be adhered thereto and removed when it is desirable to change a graphic wall or billboard display.

Figure 2:
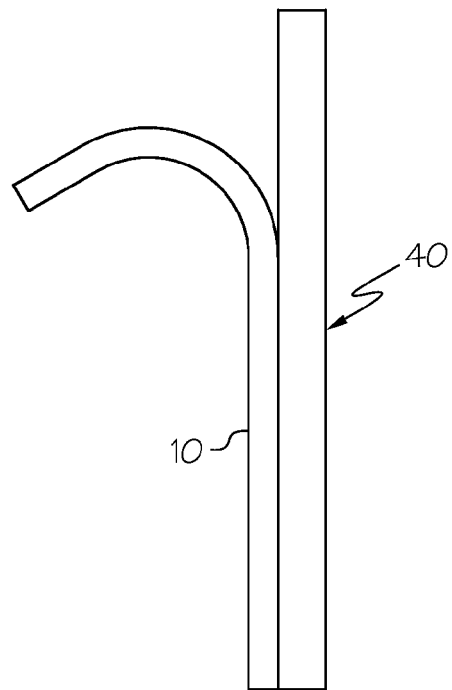
FIG. 2 is a side view of a wall having magnetic receptive media adhered thereto.

FIG. 2 is a side view illustrating magnetic receptive media 10 adhered to a magnetic wall 40 via magnetic attraction whereby the magnetic wall 40 grabs and holds the magnetic receptive media 20.

The above examples are for illustrative purposes only, and not limiting to the scope of the present invention. The method steps can be varied as is understood by those of ordinary skill in the art.

The description provided herein is not to be limited in scope by the specific embodiments described which are intended as single illustrations of individual aspects of certain embodiments. The methods, compositions and devices described herein can comprise any feature described herein either alone or in combination with any other feature(s) described herein. Indeed, various modifications, in addition to those shown and described herein, will become apparent to those skilled in the art from the foregoing description and accompanying drawings using no more than routine experimentation. Such modifications and equivalents are intended to fall within the scope of the appended claims.

All published documents, including all US patent documents and US patent publications, mentioned anywhere in this application are hereby expressly incorporated herein by reference in their entirety. Any copending patent applications, mentioned anywhere in this application are also hereby expressly incorporated herein by reference in their entirety. Citation or discussion of a reference herein shall not be construed as an admission that such is prior art.

The invention claimed is:

1. Magnetic receptive media, the magnetic receptive media comprises at least one printable substrate layer and at least one layer formed from a hot melt polymer composition, the hot melt polymer composition comprising:

a) greater than about 70% to about 95% magnetite; and b) about 5% to less than about 30% thermoplastic polymer.

2. The magnetic receptive media of claim 1, the hot melt polymer composition comprising:
   a) about 75% to about 95% magnetite; and
   b) about 5% to about 25% thermoplastic polymer.

3. The magnetic receptive media of claim 1, the hot melt polymer composition comprising:
   a) about 80% to about 95% magnetite; and
   b) about 5% to about 15% thermoplastic polymer.

4. The magnetic receptive media of claim 1 wherein said magnetic receptive media is a component of a graphic wall system.

5. The magnetic receptive media of claim 4 wherein said graphic wall system comprises a magnetic backing which can be secured to a vertical flat surface for displaying said magnetic receptive media.

6. The magnetic receptive media of claim 5 wherein said magnetic backing comprises a magnetic layer having a thickness of about 500 microns to about 1000 microns.

7. The magnetic receptive media of claim 5 wherein said magnetic backing is built into a vertical wall.

8. The magnetic receptive media of claim 1 wherein said hot melt polymer composition comprises at least one copolymer of ethylene or a blend thereof.

9. The magnetic receptive media of claim 8 wherein said at least one copolymer of ethylene comprises at least one monomer selected from the group consisting of vinyl acetate, n-butyl acrylate, (meth)acrylic acid, ethylene methyl (meth)acrylate and ethylene ethyl (meth)acrylate.

10. The magnetic receptive media of claim 1 wherein said at least one thermoplastic polymer is ethylene vinyl acetate or a blend thereof.

11. The magnetic receptive media of claim 1 wherein the magnetic receptive layer is about 75 microns to about 300 microns.

12. An in-line method of making a magnetic receptive media, the magnetic receptive media having dimensions of thickness, width and length, the method comprising:
    a) providing a hot melt composition comprising about 60% to about 95% magnetite and about 5% to about 40% thermoplastic polymer; and
    b) extruding said hot melt composition at an elevated temperature directly onto a printable substrate layer using a slot die head to form a roll or a sheet comprising the printable substrate layer and a layer of the hot melt composition at a speed of about 60 feet/minute to about 1000 feet/minute.

13. The method of claim 12 further comprising the steps of:
    c) feeding the roll or sheet through a printing press;
    d) printing on the printable substrate layer.

14. The method of claim 12 wherein the printable substrate layer comprises at least one member selected from the group consisting of paper, paper products, paste board, polyolefin, vinyl, polyester and nylon.

15. The method of claim 12 wherein said printable substrate layer comprises a roll or sheet having a width of about 60 inches.

16. A continuous system for preparing a magnetic receptive media, the magnetic assembly comprising at least one printed substrate layer and at least one magnetic layer, the system comprising:
    an extruder for applying the magnetic layer;
    at least one slot die head in communication with the extruder;
    a moving substrate, the extruder supplies the slot die head with a polymeric magnetic composition comprising at least one polymer and at least one magnetic material, the magnetic material comprising magnetic particles, the slot die head applies the polymeric magnetic composition onto said substrate to form the magnetic layer onto the substrate;
    a printing press, the substrate is advanced through the printing press; and
    a controller;
    wherein the extruder and the printing press are in operative communication with the controller, so that the thickness of the magnetic layer and the speed of the moving substrate can be controlled by the controller.

17. The system of claim 14 comprising a speed of about 60 feet/minute to about 1000 feet/minute.

18. The system of claim 14 comprising a speed of about 350 feet/minute to about 500 feet/minute.

* * * * *